(12) United States Patent
Reiser et al.

(10) Patent No.: US 6,455,183 B1
(45) Date of Patent: Sep. 24, 2002

(54) VACUUM OXIDANT PEM FUEL CELL

(75) Inventors: Carl A. Reiser, Stonington, CT (US); Richard D. Sawyer, Groveton, NH (US)

(73) Assignee: UTC Fuel Cells, LLC, South Windsor, CT (US)

( * ) Notice: Subject to any disclaimer, the term of this patent is extended or adjusted under 35 U.S.C. 154(b) by 41 days.

(21) Appl. No.: 09/741,279

(22) Filed: Dec. 19, 2000

(51) Int. Cl.$^7$ ................................. H01M 8/04
(52) U.S. Cl. ........................... 429/34; 429/38
(58) Field of Search ..................... 429/12, 13, 17, 429/34, 38, 39

(56) References Cited

U.S. PATENT DOCUMENTS

RE35,002 E    7/1995   Matsubara et al.
6,242,118 B1 * 6/2001   Grasso et al. ................. 429/12

\* cited by examiner

Primary Examiner—Patrick Ryan
Assistant Examiner—M. Wills
(74) Attorney, Agent, or Firm—M. P. Williams

(57) ABSTRACT

Reactant air is drawn through a fuel cell stack (11) by a pump (38) connected to the air exhaust manifold (29). The fuel exhaust (19, 43) may be connected to the air exhaust (39) before either being released to atmosphere through a duct (44), or consumed in a catalytic converter (47). The fuel cell power plant may be disposed within a casing (52) so that the fuel exhaust (55) and/or all fuel leaks may mix with the fresh incoming air (56, 59) and be reacted on the cathode catalysts to form water. A fuel cell (10c) may have a low profile configuration suitable for mounting beneath the passenger compartment of an automobile.

9 Claims, 3 Drawing Sheets

VACUUM OXIDANT PEM FUEL CELL

TECHNICAL FIELD

This invention relates to drawing the oxidant into a fuel cell by means of a pump, thereby eliminating the need for an inlet manifold, and encasing the fuel cell to permit the purging of leak and effluent hydrogen from the anode.

BACKGROUND ART

Fuel cells are being used to provide electricity as the primary source of power for operating vehicles. Typically, polymer electrolyte membrane (PEM) fuel cells are used in vehicles. However, for efficient passenger vehicles, the spatial power density is important. Any leakage of fuel reactant can impair the environment within the vehicle and threaten the safety of passengers.

In commonly owned U.S. patent application Ser. No. 09/265,139, filed Mar. 8, 1999, a fuel cell stack has blowers at the exhaust of the oxidant flow fields to draw air into the air inlet manifold and through the oxidant flow fields of the stack. Valves allow recycling a portion of the oxygen-depleted air through a recycling channel to the air inlet manifold. The recycling channel encompasses the area external of the fuel manifolds so the recycling air flow will sweep any gas leaking through the fuel manifold seals back to the air inlet manifold, thence to be consumed at the cathodes of the cells. However, the re-introduction of oxygen-depleted air necessitates an increase in air utilization which in turn requires more air flow, a higher pressure drop across the oxidant flow fields, and an attendant increase in parasitic power required. The fuel cell stack of said application requires both an air inlet manifold and an air outlet manifold.

DISCLOSURE OF INVENTION

Objects of the invention include reducing the size of a fuel cell power plant, such as for use in a vehicle; providing a fuel cell power plant configured to lower a vehicle center of gravity; reducing the effects of leakage of fuel reactant in the surrounding environment and within the vehicle; combusting spent fuel and leaked fuel; combusting leaked fuel without use of oxygen-depleted air; and improved operation of a fuel cell suitable for use as the main source of power in a vehicle.

According to the present invention, the oxidant reactant gas of a fuel cell is drawn into the fuel cell by means of a pump at the reactant gas outlet, thereby eliminating the need for an oxidant reactant gas inlet manifold. According to the invention further, the fuel cell is totally encased, so that any hydrogen leaks will be mixed with air within the casing, drawn into the fresh fuel cell air supply, and consumed by catalytic reaction on the cathode catalyst of the fuel cell. In accordance with the invention further, the fuel reactant exhaust, or venting from fuel recycling apparatus, may be vented directly into the case, so that all of the unspent fuel will mix with the incoming air and be consumed by catalytic reaction on the cathode catalyst. Or, the unspent fuel exhaust, or venting from fuel recycling apparatus, may be diluted with the oxidant exhaust before venting to the atmosphere.

The invention reduces the size of a fuel cell suitable for use in an electric automobile, and reduces the concentration of or eliminates unspent fuel vented into the environment, and eliminates hydrogen leaks into the vehicle. The invention allows a low center of gravity configuration for a vehicle.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
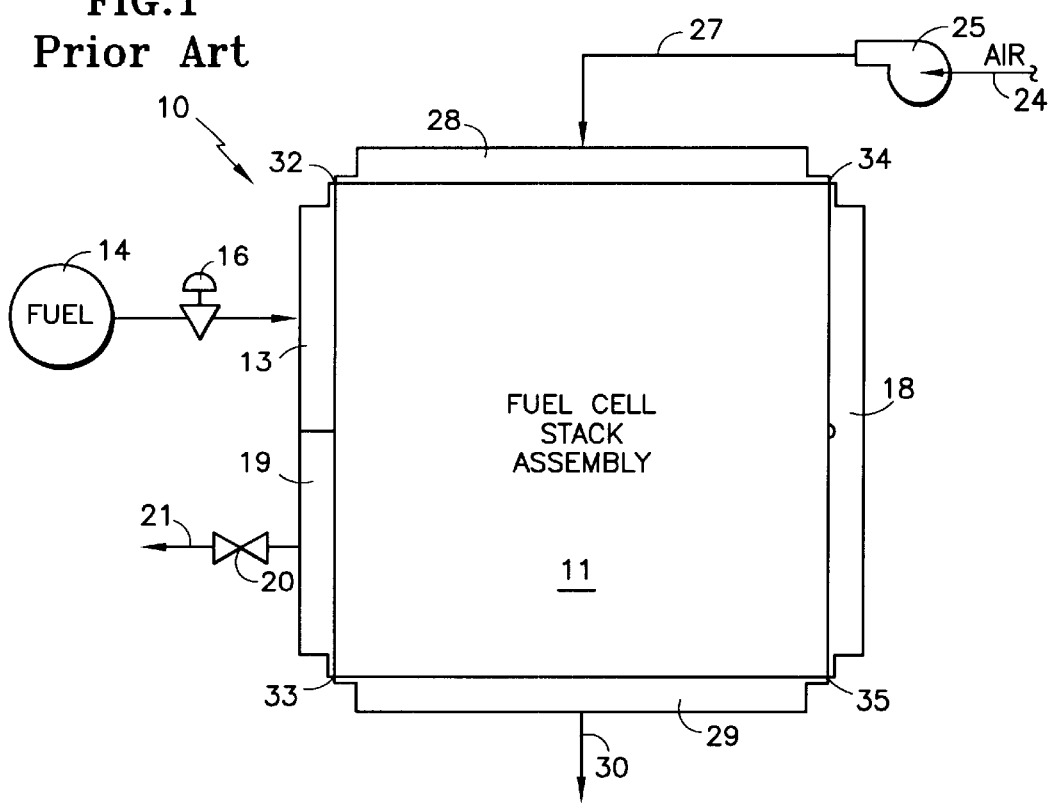
FIG. 1 is a schematic illustration of one form of fuel cell arrangement known to the prior art.

Referring to FIG. 1, a conventional fuel cell 10, which typically may be a PEM fuel cell, includes a stack 11 of contiguous individual fuel cells. The fuel cell stack 11 receives gaseous fuel reactant, which may be hydrogen gas, or other hydrogen containing gas, through a fuel inlet manifold 13. Fuel from a source 14 (such as a tank of pressurized hydrogen) is provided through a pressure regulating valve 16 to the fuel inlet manifold 13. A fuel turn-around manifold 18 sends the fuel flow back through the stack 11 to a fuel exhaust manifold 19, the fuel then passing through a flow control valve 20 and to an exhaust duct 21. Air in an air inlet duct 24 is provided by a blower or pump 25 through a duct 27 to an air inlet manifold 28. The air flows through the stack 11 and exits through an air exhaust manifold 29 and an exhaust duct 30 where it is returned to ambient.

It is known that it is difficult to ensure the viability of all of the seals within a fuel cell stack assembly, particularly the seals 32–35 of the hydrogen manifolds.

Figure 2:
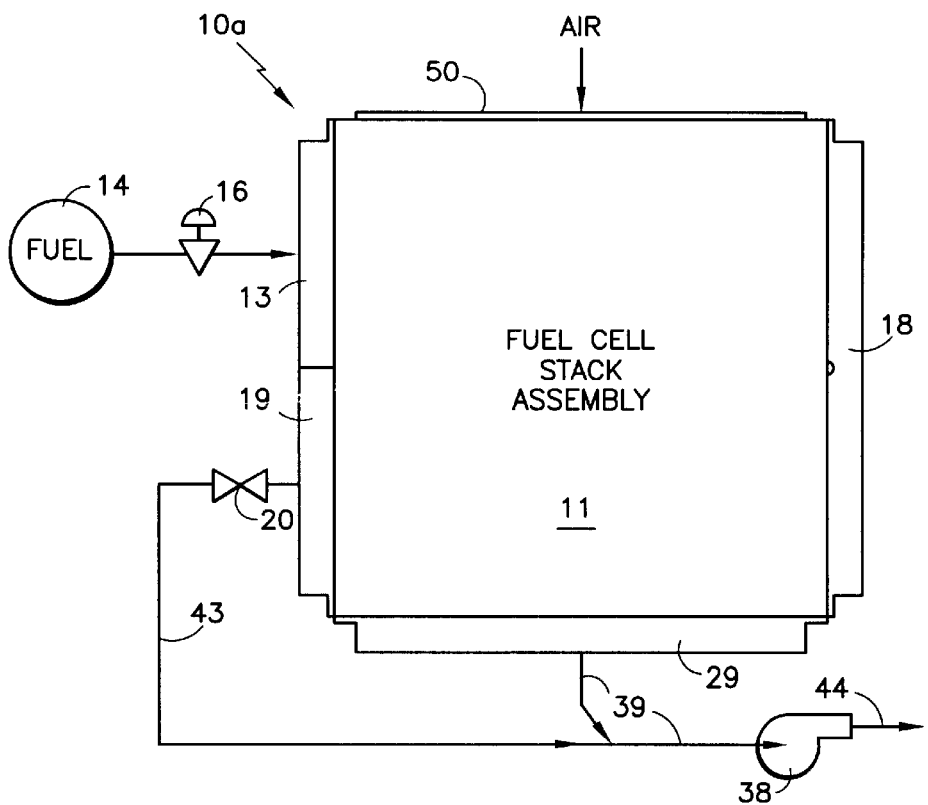
FIG. 2 is a schematic illustration of a fuel cell according to the invention not employing a casing, and having the fuel reactant effluent ducted to the oxidant reactant exhaust vacuum pump.
Figure 3:
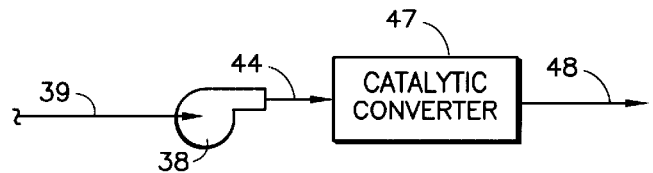
FIG. 3 is a partial, schematic illustration of a catalytic converter which may be utilized with various embodiments of the invention.

A first aspect of the present invention is elimination of the air inlet manifold 28 (FIG. 1). In FIG. 2, this is achieved in a fuel cell 10a by evacuating the air exhaust manifold 29 by means of a pump 38 which is connected thereto by a duct 39. In this embodiment, the fuel exhaust is connected by a duct 43 to the air exhaust pump 38, before being released to ambient through a duct 44. It is known that the combined fuel and air exhaust of a properly constructed and operated PEM fuel cell will have significantly less than four percent hydrogen, and thereby not pose an explosion or fire hazard to the environment. Once released into the atmosphere, the hydrogen becomes insignificant. However, the remaining fuel and oxygen in the exhaust duct 44 may be reacted in a catalytic converter 47, FIG. 3, before being released to atmosphere through a duct 48, if desired, as is described in commonly owned U.S. Pat. No. 6,124,054. If desired, the air entering the fuel cell stack assembly 11 in FIG. 2 may be passed through a filter 50 which may be similar to filters utilized in heating, ventilating and air conditioning systems. It is common in the art to recycle the fuel. In such case, the duct 43 would pass the fuel effluent to the fuel recycle apparatus; however, any venting from the recycle apparatus may be connected to the air exhaust pump 38.

Figure 4:
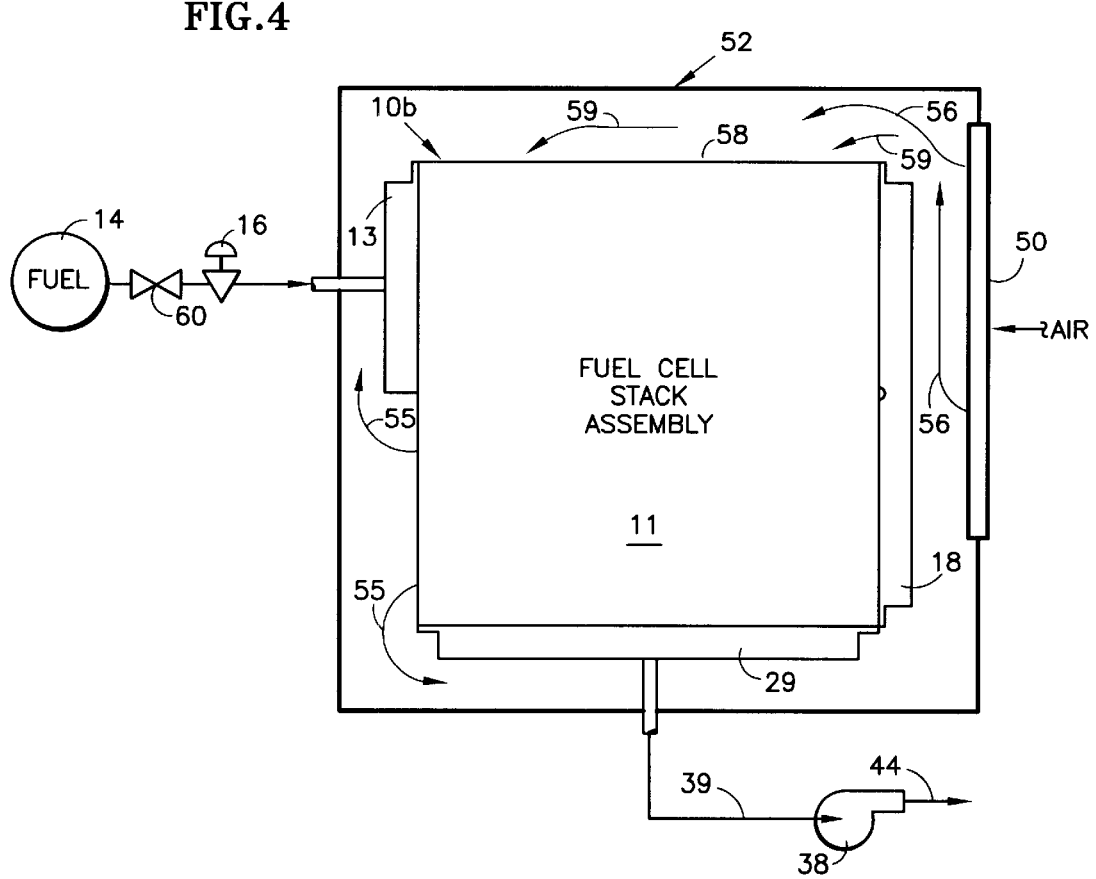
FIG. 4 is a schematic illustration of an embodiment of the invention in which the entire fuel cell is encased, and the fuel reactant is vented into the case for mixture with incoming air, to be combusted at the cathode catalyst.

In the embodiment of the invention illustrated in FIG. 4, the entire fuel cell power plant 10b is disposed within a casing 52. In this embodiment, by way of example, there is no fuel exhaust manifold 19. Instead, the fuel is vented into the casing 52, as is illustrated by the arrows 55. If the fuel is recycled through a fuel exhaust manifold, any venting from the recycle apparatus may be released into the casing 52. The air may enter the casing through a filter 50, as illustrated by the arrows 56, and then enter the side 58 of the stack which is opposite the air exhaust manifold 29, as illustrated by the arrows 59. The spent fuel will mix with the air before entering the stack 11, where it safely reacts on the cathode catalyst to form water. In a properly constructed and maintained fuel cell, the leakage will be much less than one percent of the fuel inlet flow. In turn, the fuel exhaust will be on the order of between one percent and five percent of the inlet fuel flow. Since the fuel will be totally consumed at the cathode catalysts, the exhaust duct 44 may safely vent the air flow field exhaust to ambient.

A flow control valve 60 may be provided in the fuel inlet.

Figure 5:
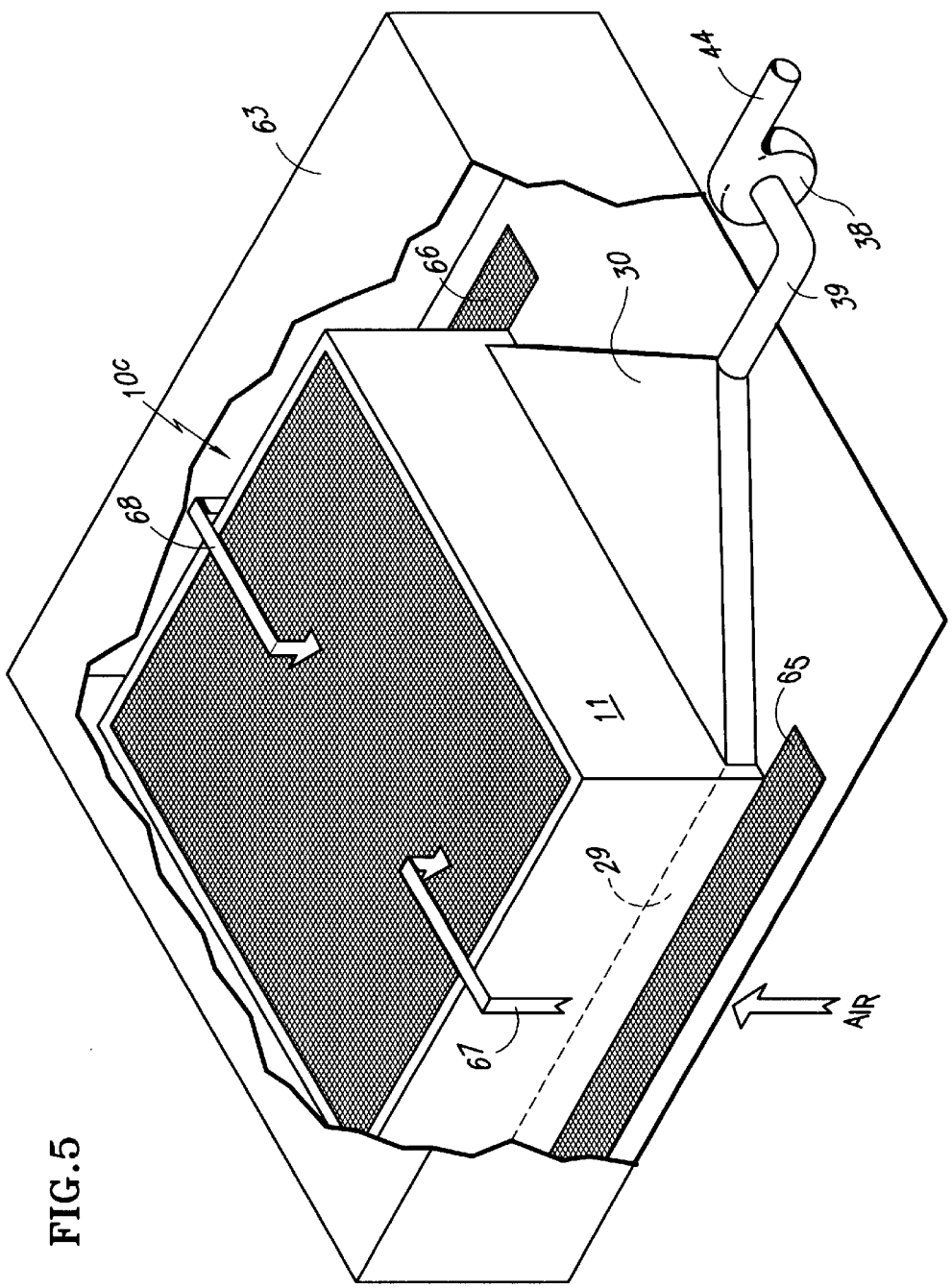
FIG. 5 is a perspective view of one configuration for implementing the encased embodiment of the present invention, with the fuel reactant flow apparatus eliminated for clarity.

The embodiment of FIG. 4 may, for example, be implemented in a manner illustrated in FIG. 5. Therein, a fuel cell power plant 10c is disposed within a casing 63. The casing 63 may have air inlet filters 65, 66 through which reactant air is drawn. The arrows 67, 68 illustrate that the air flow in the configuration of FIG. 5 will be up the sides of the stack 11, and then into the stack through the top thereof, through an air exhaust manifold 29 at the bottom of the stack, a transition section 30, and then through the pump 38 and ducts 39, 44. In FIG. 5, all of the fuel ductwork and manifolds have been eliminated for clarity.

Other configurations may be used, the particular configuration being irrelevant to the present invention. Another alternative configuration may provide the fuel cell 10b of FIG. 3 with a fuel exhaust manifold 19 and duct 43 (FIG. 2) for connection with the duct 39 so that the fuel exhaust is vented with the air exhaust, but any leaked fuel will be drawn into the air inlet and consumed at the cathode catalyst. The low profile configuration of FIG. 5 is particularly well suited to be disposed beneath the passenger compartment of an automobile, thereby providing the automobile with a very low center of gravity.

The aforementioned patent and patent application are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fuel cell system for supplying electric power, comprising:
    a fuel cell stack including an electrolyte, a cathode catalyst disposed on one side of said electrolyte, an anode catalyst disposed on the opposite side of said electrolyte, an anode flow field having an inlet for allowing a stream of a hydrogen-containing fuel to contact said anode catalyst, said anode flow field having a flow outlet, a cathode flow field having an inlet for flowing an oxidant in contact with said cathode catalyst, said cathode flow field having a flow outlet; a source for providing hydrogen-containing fuel to said anode flow field; and an oxidant pump providing oxidant to said cathode flow field;
    wherein the improvement comprises:
        a casing surrounding said fuel cell stack, said casing having an air inlet, said cathode flow field inlet receiving air from the interior of said casing; and
        said oxidant pump disposed outside of said casing and interconnected with said cathode flow outlet to draw oxidant through said cathode flow field, said fuel cell system having no oxidant inlet manifold.

2. A fuel cell system for supplying electric power, comprising:
    a fuel cell stack including an electrolyte, a cathode catalyst disposed on one side of said electrolyte, an anode catalyst disposed on the opposite side of said electrolyte, an anode flow field having an inlet for allowing a stream of hydrogen-containing fuel to contact said anode catalyst, said anode flow field having an outlet, a cathode flow field having an inlet for flowing an oxidant in contact with said cathode catalyst, said cathode flow field having a flow outlet; a source for providing a hydrogen-containing fuel to said anode flow field, and an oxidant pump providing oxidant to said cathode flow field;
    wherein the improvement comprises:
        said oxidant pump interconnected with said cathode flow field flow outlet to draw oxidant through said cathode flow field, said fuel cell system having no air inlet manifold.

3. A fuel cell system for supplying electric power, comprising:
    a fuel cell stack including an electrolyte, a cathode catalyst disposed on one side of said electrolyte, an anode catalyst disposed on the opposite side of said electrolyte, an anode flow field having an inlet for allowing a stream of a hydrogen-containing fuel to contact said anode catalyst, said anode flow field having a flow outlet, a cathode flow field having an inlet for flowing an oxidant in contact with said cathode catalyst, said cathode flow field having a flow outlet; a source for providing a hydrogen-containing fuel to said anode flow field; and an oxidant pump providing oxidant to said cathode flow field;
    wherein the improvement comprises:
        a casing surrounding said fuel cell stack, said casing having an air inlet, said cathode flow field inlet receiving air from the interior of said casing; and
        said oxidant pump disposed outside of said casing and interconnected with said cathode flow outlet to draw oxidant through said cathode flow field.

4. A fuel cell system according to claim 2 or 3 wherein:
    said anode flow field flow outlet is connected to said oxidant pump.

5. A fuel cell system according to claim 4 wherein the exhaust of said oxidant pump is vented to ambient.

6. A fuel cell system according to claim 4 wherein the exhaust of said oxidant pump is connected to a catalytic converter, separate from said fuel cell, the exhaust of said catalytic converter being vented to ambient.

7. A fuel cell system according to claim 2 or 3 wherein:
    said fuel cell system is operated with oxidant gas pressure below ambient.

8. A fuel cell system according to claim 3 wherein:
    said anode flow field flow outlet vents to the interior of said casing, whereby anode flow field effluent and fuel leakage are both exhausted through said casing.

9. A fuel cell system according to claim 3 wherein:
    said anode flow outlet is connected to said oxidant pump, whereby only fuel leakage is exhausted through said casing.

* * * * *